United States Patent Office 3,394,990
Patented July 30, 1968

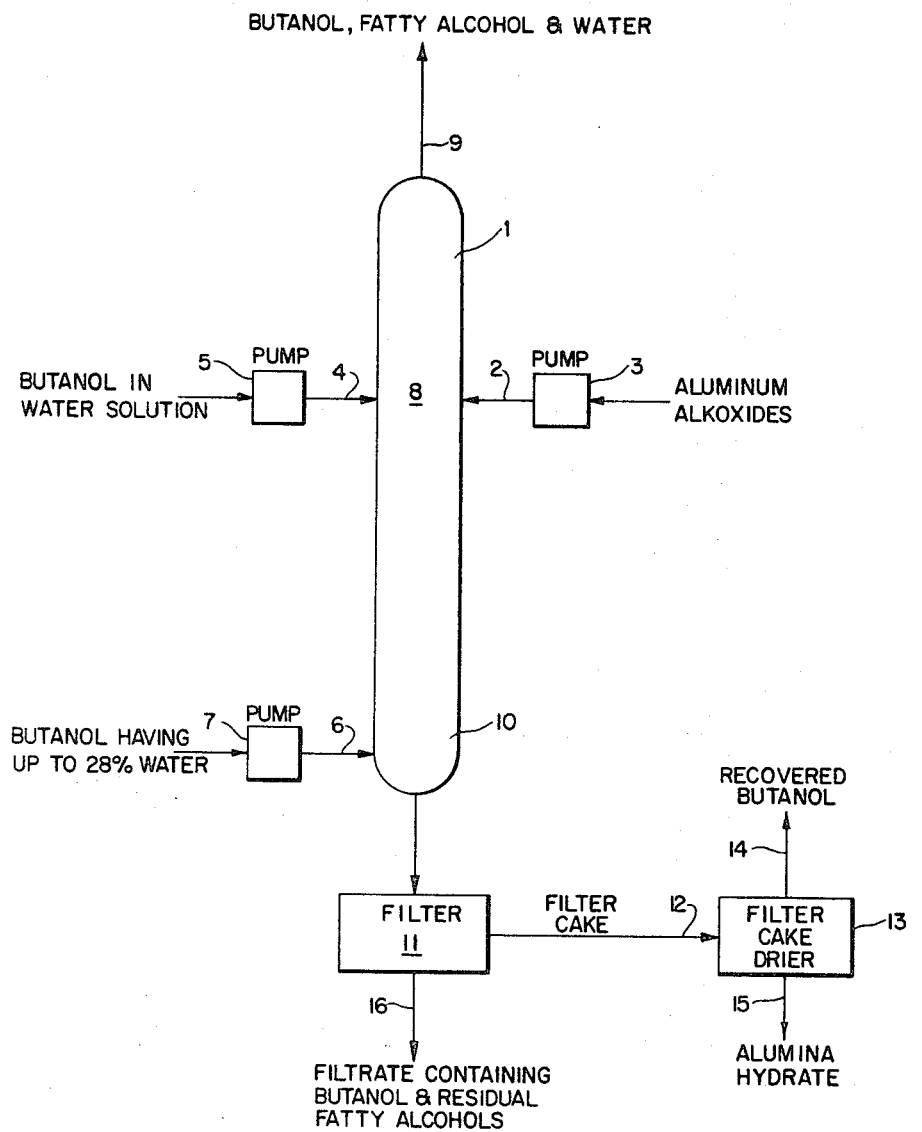

3,394,990
PROCESS FOR THE HYDROLYSIS OF
ALUMINIUM ALKOXIDES
Ernst Weingaertner, Hamburg, Gündolf Füchs, Maschen, and Wilfried Jordan, Gladbeck, Zweckel, Germany, and Martin Merz, Reno per Leggiuno, Varese, Italy, assignors to Deutsche Erdol-Aktiengesellschaft, Hamburg, Germany, a German company
Filed May 7, 1964, Ser. No. 365,747
Claims priority, application Germany, May 11, 1963,
D 41,539
7 Claims. (Cl. 23—143)

In the manufacture of straight or branched chain fatty alcohols by the Ziegler method the fatty alcohols are separated in the last stage of the process by the hydrolysis of the aluminium alkoxides (aluminium fatty alcoholates). This hydrolysis is usually carried out with dilute sulphuric acid or with sodium hydroxide solution of a certain concentration, and there is obtained as a less valuable second product of the process aluminium sulphate or sodium aluminate, from which an alkali-containing alumina hydrate is obtained that does not meet industrial requirements.

There are certain advantages in carrying out the hydrolysis in distilled water, which is a neutral medium, but this leads to an alumina hydrate which, although free from alkali, contains considerable quantities of fatty alcohols adsorptively bound thereto. In order to avoid losses of fatty alcohols, that is to say, the main product of the process, and also to obtain a pure alumina hydrate, it has been necessary to carry out an extraction process whenever possible in several stages. There have been used as extraction agents alcohols of low molecular weight, and it has been found that there is an increase in the extraction effect in passing from ethanol via propanol to the butanols. All butanols are suitable for extracting the fatty alcohols, and n-butanol is especially advantageous. As the latter is a by-product of the manufacture of fatty alcohols mentioned above, it is also especially readily available. References to butanol in the following description mean n-butanol.

In addition to the limited success in extracting the alcohols in this hydrolysis process, the filterability of the alumina hydrate is considerably decreased owing to changes in structure.

The present invention is based on the observation that the difficulties, that arise in carrying out the hydrolysis in a neutral medium and in the separation of the resulting products, are avoided by carrying out the hydrolysis in a homogeneous liquid phase which consists of butanol and water. The aluminium alkoxide to be hydrolysed is introduced into a butanol phase which has a content of water ranging up to the saturation point at the reaction temperature. At the same place as the aluminium alkoxide is introduced there is introduced into the hydrolysis zone the quantity of butanol-containing water necessary for the hydrolysis but insufficient to form a second liquid phase. The hydrolysis is advantageously carried out at a temperature within a range of which the upper limit is the boiling point, namely 93° C., under atmospheric pressure of a water-in-butanol phase containing the maximum amount of water, and the lower limit of which is 65° C. in order to maintain an adequate reaction velocity. The butanol contains 5 to 28 percent by weight of water dissolved therein. 28 percent by weight of water is the saturation concentration in butanol at 93° C., and 22 percent by weight is the saturation concentration at 65° C. The quantity of water in the butanol depends on the quantity of butanol-containing water introduced into the hydrolysis zone in order to avoid the formation of a second liquid phase. On the other hand, the quantity of butanol-containing water added must be sufficient, together with any water introduced with the butanol, to bring about the hydrolysis and to allow the alumina hydrate formed in the hydrolysis to bind a large amount of water. The most favourable reaction conditions are established when at the aforesaid temperatures the reaction components alkoxide:water:butanol are present in the ratio by weight of 1:(0.6 to 2):(0.7 to 4.5), respectively.

The fatty alcohols formed as hydrolysis products are dissolved immediately in the butanol and are carried upwardly out of the hydrolysis zone by means of a suitably controlled current of butanol. As the second hydrolysis product there is formed flocculent alumina hydrate which contains primary fatty alcohols adsorbed thereon. The alumina hydrate moves in a downward direction and is freed by the butanol flowing in countercurrent from adsorbed fatty alcohols to a content of below 4 percent by weight of organic substance, calculated as alumina monohydrate and fatty alcohols. Accordingly, the process of the invention enables the hydrolysis of aluminium alkoxides combined with the separation and purification of the products to be carried out in a homogeneous liquid phase consisting of butanol and water, the products of the process namely fatty alcohols and alumina hydrate to separate from each other very thoroughly, and the alumina hydrate to be obtained in an easily filterable form and free from ions.

The sludge of alumina hydrate that collects at the bottom of the reatcion column is immediately separated from adherent liquid by mechanical means, for example, by filtration or centrifuging, and the alumina hydrate is dried to alumina monohydrate which constitutes the final product.

The process of this invention is described below by way of example with reference to the accompanying drawing.

Aluminum alkoxide, which has a temperature of at least 200° C. and advantageously not exceeding 250° C., is continuously introduced through a conduit 2 by means of a pump 3 into the middle of a reaction tower 1 filled with butanol of about 85% strength which is maintained at about 90° C. At the same height as that at which the aluminum alkoxide is introduced there is introduced by means of a pump 5 through a conduit 4 distilled water at about 90° C., which is saturated with about 6% by weight of butanol, the water being introduced by means of a pump 5 so that it is available in the hydrolysis zone 8 in addition to the water content of the butanol. The rate at which the water is introduced through conduit 4 must be so regulated that a local aqueous phase does not form. The resulting alumina hydrate immediately binds large amounts of water. At the lower part of the reaction tower there is continuously introduced through a conduit 6 by means of a pump 7 in a fixed ratio relatively to the aluminium alkoxide, a butanol having a water content of 0 to 28% by weight and a temperature of 90° C., which butanol flows upwardly through the reaction tower 1 and into the hydrolysis zone 8 to carry away through the conduit 9 at the top of the tower the fatty alcohols formed. At the same time the alumina hydrate formed slowly descends in countercurrent to the butanol, whereby adherent fatty alcohols are extracted from the alumina hydrate. It is of advantage to bring about the supply of the liquids and of the alumina hydrate suspension by means of compressed air, instead of by means of pumps.

In the sedimentation zone 10 at the bottom of the tower the alumina hydrate suspension that settles out is either immediately carried away and filtered in 11 or is simultaneously concentrated by special methods of discharge.

The product alumina hydrate suspension can be filtered easily and very well, and filtration rates of 30 cubic metres of suspension per square metre of filter surface per hour are attainable. The filter cake 12 is then dried at 13, during which the butanol remaining therein is recovered at 14. The drying operation is so controlled that at the end of the process the finished alumina monohydrate, $Al_2O_3 \cdot H_2O$, is obtained at 15. If desired, the filter cake may also be washed with pure butanol. The filtrate 16 obtained from the filtration is also distilled to recover the butanol and residual fatty alcohols therefrom.

The solution of fatty alcohols in butanol that leaves the top of the reaction tower at 9, which has a water content from 8 to 18% by weight and a fatty alcohol content from 20% to more than 50% by weight, depending on the choice of the amount of butanol, is subjected to distillation together with the filtrate 16 separated from the alumina hydrate sludge. The amounts of butanol and water distilled off are then returned to the hydrolysis-extraction process.

The following relative proportions of the pure components may be used:

Alkoxide:water:butanol in the ratio by weight of 1:(0.6 to 2.0):(0.7 to 4.5). Care must be taken that the quantity of water is always so controlled that a separate aqueous phase can never form due to the solubility gap for butanol being reached.

The above statement regarding the phase condition applies generally for a temperature range from 65° C. to 93° C., so that in the single phase butanol-containing filtrate having a temperature of 65° C. the formation of a separate aqueous phase is to be taken into account upon cooling to 25° C. or 20° C. under certain concentration ratios. However, this event does not impair the course of the hydrolysis process or the filtration, as the filtrate at the temperature of filtration, which ranges from 65° C. to 93° C., still consists of a single phase, and two-phase formation can only occur after the butanol has been separated from the alumina hydrate, and only then if it has been cooled.

The following examples illustrate the invention:

Example 1

In a hydrolysis reactor such as is shown diagrammatically in the drawing there are introduced per hour 1510 kg. of aluminium alkoxide having a temperature of 210° C., 1230 kg. of recycled water containing 6% of butanol, and 3000 kg. of recycled butanol containing 15% of water, the two latter liquids being introduced at 90° C. These quantities correspond to a ratio of pure materials of 1:1.07:1.74 (aluminium alkoxide:water:butanol). The temperature during the hydrolysis in the reactor was 90° C. The liquid was discharged from the top of the reactor at the rate of 3150 kg. per hour, and it had the following composition:

|  | Percent |
|---|---|
| Crude alcohols | 45.3 |
| Butanol | 45.8 |
| Water | 8.9 | the alumina-containing product was discharged from the lower end of the tower at the rate of 2590 kg. per hour. After being discharged from the reactor it was filtered at 65° C. and had a filtration rate of more than 30 cubic metres of filtrate per square metre of filter surface per hour. The filter cake was obtained at the rate of 1410 kg. per hour and had the following composition:

|  | Percent |
|---|---|
| Crude alcohols | 0.5 |
| Butanol | 9.7 |
| Water | 77.0 |
| Aluminium oxide (calculated as $Al_2O_3$) | 12.8 |

The filtrate was obtained at the rate of 1180 kg. per hour and had the following composition:

|  | Percent |
|---|---|
| Crude alcohols | 2.9 |
| Butanol | 74.9 |
| Water | 22.2 |

After drying the alumina hydrate to the monohydrate it had a crude alcohol content of 3.2%.

Example 2

Into a hydrolysis reactor, such as is shown diagrammatically in the drawing, there were introduced, per hour, 1510 kg. of aluminium alkoxide having a temperature of 210° C., 1640 kg. of recycled water having a butanol content of 6%, and 4370 kg. of recycled butanol having a water content of 10%, the two latter liquids being introduced at a temperature of 90° C. These quantities correspond to a ratio of the pure materials of 1:1.31:2.67 (aluminium alkoxide:water:butanol). During the hydrolysis the temperature in the reactor was 90° C. At the top of the reactor the liquid was withdrawn at the rate of 4750 kg. per hour, and it had the following composition:

|  | Percent |
|---|---|
| Crude alcohols | 26.7 |
| Butanol | 60.9 |
| Water | 12.4 |

The alumina-containing product was discharged from the bottom of the reactor at the rate of 2770 kg. per hour. After being discharged from the reactor it was filtered at 65° C. and had a filtration rate above 30 cubic metres of filtrate per square metre of filter surface per hour. The filter cake was obtained at the rate of 1310 kg. per hour and had the following composition:

|  | Percent |
|---|---|
| Crude alcohols | 0.6 |
| Butanol | 14.6 |
| Water | 71.9 |
| Aluminium oxide (calculated as $Al_2O_3$) | 12.9 |

The filtrate was obtained at the rate of 1450 kg. per hour and had the following composition:

|  | Percent |
|---|---|
| Crude alcohols | 1.3 |
| Butanol | 77.2 |
| Water | 21.5 |

After drying the alumina hydrate to the monohydrate it had a content of crude alcohols of 3.8%.

We claim:

1. A process for the hydrolysis of aluminium alkoxide, wherein the aluminium alkoxide is hydrolysed by means of water at a temperature within the range of from 65° C. to 93° C. within a column, said process comprising the steps of continuously introducing into said column and passing upwardly in said column n-butanol having a water content ranging from zero to 28 percent by weight, continuously introducing an aluminium alkoxide into said column and into said n-butanol at a point above the region at which said n-butanol is introduced, continuously introducing into said column and into said n-butanol at a point above the region where said n-butanol is introduced a solution of n-butanol in water at a rate sufficient to hydrolyse the alkoxide but insufficient to form a second liquid phase, continuously removing from the upper end of the column n-butanol having dissolved therein water and fatty alcohol, the fatty alcohol being formed by the hydrolysis of said alkoxide, and continuously discharging from the lower end of said column the aqueous suspension of alumina hydrate that is also formed by the hydrolysis and that descends in the column.

2. The process defined in claim 1 wherein said n-butanol having said water content of zero to 28 percent and said solution of n-butanol in water are supplied to said column at a temperature that is substantially the same as the hydrolysis temperature.

3. The process defined in claim 1 wherein said aluminium alkoxide is supplied to said column at a temperature ranging from 200° C. to 250° C.

4. The process as defined in claim 1 wherein the alumina hydrate suspension discharged from the column is subsequently mechanically freed from adherent liquid at a temperature above that at which the adherent liquid forms two liquid phases.

5. The process as defined in claim 4, wherein the alumina hydrate freed from adherent liquid is subsequently dried to form alumina monohydrate.

6. The process defined in claim 1 wherein the water in said solution is saturated with n-butanol.

7. A process for the hydrolysis of aluminium alkoxide, wherein the aluminium alkoxide is hydrolysed by means of water at a temperature within the range of from 65° C. to 93° C. within a column, said process comprising the steps of continuously introducing into said column and passing upwardly in said column n-butanol having a water content ranging from zero to 28 percent by weight, continuously introducing an aluminium alkoxide into said column and into said n-butanol at a point above the region at which said n-butanol is introduced, continuously introducing into said column and into said n-butanol at a point above the region where said n-butanol is introduced a solution of n-butanol in water at a rate sufficient to hydrolyse the alkoxide but insufficient to form a second liquid phase, the components being supplied to said column in unit time at a ratio by weight of 1 part of aluminium alkoxide to 0.6–2 parts of water to 0.7–4.5 parts of n-butanol, continuously removing from the upper end of the column n-butanol having dissolved therein water and fatty alcohol, said fatty alcohol being formed by the hydrolysis of said alkoxide, and continuously discharging from the lower end of said column the aqueous suspension of alumina hydrate that is also formed by the hydrolysis and that descends in the column.

References Cited

UNITED STATES PATENTS

| | | | |
|---|---|---|---|
| 3,087,954 | 4/1963 | McClaflin | 260—632 |
| 3,247,264 | 4/1966 | Beears et al. | 260—632 |
| 3,255,256 | 6/1966 | Miller | 260—632 |
| 3,264,063 | 8/1966 | Carter | 260—632 |

FOREIGN PATENTS

| | | |
|---|---|---|
| 941,567 | 11/1963 | Great Britain. |
| 1,304,370 | 8/1962 | France. |

BERNARD HELFIN, *Primary Examiner.*

J. E. EVANS, *Assistant Examiner.*